3,173,891
POLYCARBONATE PROCESS
John S. Fry, Hillsborough Township, and John Wynstra, Berkeley Heights, N.J., and Wendell W. Moyer, Parkersburg, W. Va., assignors to Union Carbide Corporation, a corporation of New York
No Drawing. Filed Oct. 10, 1960, Ser. No. 61,382
10 Claims. (Cl. 260—47)

This invention relates in general to the production of synthetic polymers, and more particularly to an improved process for preparing polycarbonate resins.

It has formerly been proposed to prepare polycarbonate resins by the general method of direct phosgenation of a (4,4'-dihydroxy-diphenyl)-alkane in the presence of a stoichiometric excess of an alkali metal hydroxide such as sodium hydroxide. More specifically it has been proposed to dissolve or suspend a (4,4'-dihydroxydiphenyl)-alkane in an aqueous solution of a stoichiometric excess of sodium hydroxide and an inert organic solvent, and then to phosgenate the (4,4'-dihydroxy-diphenyl)-alkane by bubbling phosgene into the mixture while maintaining the reaction system at a temperature of about 20° C. to about 30° C. The immediate result of the phosgenation step was the production of a reaction mass consisting of an inorganic phase containing water, unreacted alkali and by-product salts of the reaction, and an organic phase which is a viscous solution of low molecular weight polycarbonates in the solvent used. By prolonged stirring in the presence of unused alkali this intermediate, low molecular weigh polymer was "bodied" or further polymerized into a high molecular weight polycarbonate resin. Simular results have been achieved, and the prolonged stirring obviated, by the use of a quaternary ammonium catalyst to body the intermediate polymer. In either procedure, the final polymer mixture was neutralized with acid, washed free from electrolytes with water, and the polycarbonate resin isolated after being coagulated with a conventional agent such as methanol, ethanol, isopropanol, acetone, boiling water or the like.

In practice, however, it has been found that polycarbonate production methods of this type are difficult to reproduce in the sense that the average molecular weight of the polycarbonates formed vary to a substantial degree from batch to batch. This difficulty is generally believed to be due to the effect of competing side reactions which result in small but highly significant differences in the structure of the end groups of the intermediate polymer from one batch to another. Thus, in order to approach reproducibility, the most careful control must be exercised over such factors as the total amount of phosgene added, the rate at which phosgene is introduced into the reaction mixture, the temperature of the reaction, the degree to which the reaction mixture is stirred or otherwise agitated, and the time lapse occurring between the cut-off of phosgene addition and the start of addition of the quarternary ammonium bodying agent. The addition of chain growth terminators such as tert-butylphenol to limit the molecular weight of the polymer to the range of most practical interest was not found to inhibit appreciably the considerable variation of average molecular weight from batch to batch.

Control of molecular weight is of considerable importance in that below a certain minimum average, polycarbonates suffer loss of toughness. On the other hand, very high molecular weight polymers are not useful because of the difficult problems encountered in attempted heat forming operations. Therefore, a process control over molecular weight within close limits is essential.

It has also been proposed to achieve better reproducibility by controlling the pH of the reaction system during the phosgenation of the bisphenol to limits within the range of from about 10.5 to 11.8. Ideally, the phosgenation of a bisphenol in the presence of sodium hydroxide proceeds according to the following four steps:

(1) Formation of the sodium salt of the bisphenol by reaction between the bisphenol and sodium hydroxide;

(2) Reaction of phosgene with the sodium salt of the bisphenol to yield the corresponding chloroformate or dichloroformate derivative;

(3) The reaction of the chloroformate terminated bisphenol with a sodium-bis(phenolate) molecule produced by reaction step (1); and (4) The combination of reaction steps (2) and (3) to give an intermediate polymer possessing only chloroformate end groups.

However, where there is a large excess of alkali metal hydroxide, i.e., hydroxyl ions, several side reactions are possible which lead to decreased process efficiency and inferior final polymer product. In particular, three such side reactions are believed to be especially harmful. These are: (a) the reaction of phosgene with aqueous alkali metal hydroxide to form alkali metal carbonate and alkali metal chloride; (b) the reaction of the chloroformate terminated bisphenol or the intermediate chloroformate terminated polymer with aqueous caustic whereby the sodium phenolate end groups are regenerated; and (c) the saponification of the carbonate linkages of the intermediate polymer. Saponification reaction (c) probably occurs to a much lesser extent than the other two specified side reactions.

Therefore, by employing from about 5 percent to about 80 percent of the theoretical amount of alkali metal hydroxide required to react with the dihydric phenol to form the double salt thereof, a buffer solution consisting of unreacted dihydric phenol and the corresponding alkali metal salt was established which had a pH value within the required range, and the process was rendered more reproducible insofar as the polymer immediately resulting from the phosgenation reaction is concerned.

The "bodying" step, however, by means of which the relatively low molecular weight polymer chains resulting from phosgenation of the bisphenol are coupled to increase in molecular weight, continues to give rise to problems in producing polycarbonates of uniform molecular weight throughout the polymer mass, and dependably reproducing a polymer mass of any desired predetermined average molecular weight.

It is therefore the general object of the present invention to provide an improved process for preparing polycarbonate resins, which process is inherently more reproducible and can be employed to produce a polymer product having more uniform average molecular weight, excellent processing characteristics, and processing characteristics superior to those heretofore attained in polycarbonates.

This general object, as well as others which will be apparent from the specification and appended claims, is accomplished in accordance with the process of the present invention which comprises reacting phosgene with a dihydric phenol, preferably a gem-bis(monohydroxyaryl)-alkane in the presence of an aqueous solution alkali metal hydroxide in an amount sufficient only to impart to the reaction system a pH value of between about 10.5 and about 11.8, and in the presence of a phenylphenol and a tertiary amine having the general formula

wherein R, R' and R" are each a lower alkyl group containing from 1 to 6 carbon atoms.

We have discovered that in the controlled pH reaction system, triethylamine and p-phenylphenol function as a unique bodying catalyst and chain growth terminator respectively, which cooperate to direct the course of the overall process to consistently produce polycarbonates having the same desired molecular weight from batch to batch, even though reaction variables such as temperature and length of the phosgenation period vary widely.

Although in combination with p-phenylphenol the trialkylamine serves as a remarkably effective bodying catalyst, it is substantially different in its effect upon the reaction system from conventional bodying catalysts such as the quaternary ammonium salts. For example, trialkylamines are stable toward strong alkali and for this reason can be introduced into the reaction mass as a component of the initial charge, i.e., at the beginning of the phosgenation step. Trialkylamines are also stable in storage and for long periods of time maintain full potency, so that the age of this catalyst is not a factor to be considered in determining the concentration necessary to achieve a polycarbonate of desired molecular weight. Moreover, these amines promote polymerization at a rapid rate without at the same time promoting competing degradation reactions, e.g., saponification of the newly formed polymer chains.

In contrast, quaternary ammonium salt bodying catalysts, such as benzyltrimethylammonium chloride, appear to vary in catalytic activity depending in some measure on the age of the sample employed. Further, these quaternary salts promote saponification of the newly formed polymer and cannot practically be present in the reaction system during the phosgenation of the bisphenol.

Paradoxically, despite all of the advantages of the trialkylamines, it has been found that they cannot be used alone as a bodying catalyst, since polymers having abnormally high molecular weights are produced which are difficult or impossible to fabricate by conventional means. We have found, however, that p-phenylphenol is a remarkably effective chain-grown terminator for use in combination with a trialkylamine in that p-phenylphenol has the ability to function effectively under the reaction conditions most advantageously permitted by the use of a trialkylamine. For example, triethylamine, because it does not promote undesirable side reactions such as polymer saponification, can be used compatibly in a phosgenation reaction system in which the reaction temperature, the rate of addition of phosgene, the degree of agitation, and the pH are all adjusted to achieve the greatest efficiency of operation without regard for the bodying catalyst. The p-phenylphenol in the system is not only essential, but is also compatibly employed under the same temperatures, pH, degree of agitation, etc., as the triethylamine without impairment of its ability to control the molecular weight of the polymer mass within narrow limits.

The amounts of the trialkylamine catalyst and p-phenylphenol suitably employed are not narrowly critical either with respect to the amount of bisphenol employed or with respect to each other. Preferably, the concentration of the trialkylamine is from about 0.01 to about 0.10 mole per mole of bisphenol present, with the range of from about 0.0125 to about 0.05 mole per mole of bisphenol present being particularly preferred.

Trialkylamines illustrative of those utilized in the present invention are trimethylamine, triethylamine, triisopropylamine, tri-n-butylamine, triisobutylamine, triisoamylamine, tri-n-hexylamine, and the like.

As will be readily appreciated by those in the art, the concentration of the p-phenylphenol is determined, in the main, upon the average molecular weight of the final polycarbonate products and thus can be varied within wide limits depending on the desire of the practitioner of the process. In general, however, from about 0.005 to about 0.08 mole per mole of bisphenol employed gives rise to polycarbonates having reduced viscosity values (0.2 gram polymer dissolved in 100 ml. methylene chloride at 25° C.) in the range of greatest practical interest, i.e., values of from about 0.4 to 1.5. Preferably, the p-phenylphenol is present in an amount of from about 0.01 to about 0.04 mole per mole of bisphenol.

According to a typical embodiment of our novel process the bisphenol reactant is initially charged to a reaction vessel along with the p-phenylphenol, one or a mixture of two or more of the trialkylamines, and an aqueous solution of an alkali metal hydroxide containing from about 5 percent to about 80 percent of the stoichiometric quantity required to react with the bisphenol. An organic solvent for the intermediate polymer, such as methylene chloride, is added and the reaction system is closed to the atmosphere. Phosgene and additional alkali metal hydroxide are then simultaneously introduced into the reaction in such a manner as to maintain the pH of the reaction mass between 10.5 and 11.8, preferably between 10.8 and 11.3, and at a temperature of between about 20° C. and 30° C. To insure complete reaction, the addition of phosgene is continued after addition of the sodium hydroxide is complete and until the pH of the reaction mass has dropped into the range of between 7 and 10, preferably to a pH value of about 9. It has been found that the total quantity of sodium hydroxide employed over the entire course of the reaction is at least about 125 percent of the theoretical amount required to react with the bisphenol constituent if the most efficient conversion is to be attained. Larger quantities may of course be used without harmful effect upon the process, but too great an excess results in needless waste of phosgene. After the phosgenation reaction has ceased, the reaction mixture is purged with nitrogen or any other inert gas for a period of time sufficient to remove the unreacted phosgene. A purge period of from about 10 to about 30 minutes has been found to be generally sufficient. During the purge period, it has also been found to be advantageous to raise the temperature of the reaction mixture to about 30–40° C. to aid in the rapid removal of residual phosgene. Thereafter, upon standing, an aqueous layer and an organic layer form. The aqueous layer is drawn off. An organic solvent such as methylene chloride can then be added to the organic layer to decrease the viscosity of the polymer mass which is then neutralized with acid, preferably phosphoric, but suitably other strong mineral acids forming soluble salts such as hydrochloric, or relatively strong organic acids such as oxalic or acetic acids, washed to remove electrolyte residues, coagulated as by pouring into a precipitating nonsolvent such as isopropanol, filtered and dried. The polymer yield, except for mechanical losses is quantitative, and no unreacted bisphenol is recoverable. The reduced viscosity, which is indicative of the average molecular weight of the polymer product, depends on the amount of p-phenylphenol charged.

It was surprising to find that the omission of the conventional bodying technique of adding a substantial quantity of strong base, such as aqueous sodium hydroxide, is not necessary in the process of the present invention. A comparison of several batch products, some of which were directly acidified after the phosgene purge and others of which received the conventional treatment with strong caustic revealed no significant difference in molecular weight as indicated by reduced viscosity measurements.

The process of the present invention is generally applicable to the preparation of all polycarbonate polymers and copolymers.

The dihydric phenols operable in the process of the present invention can conveniently be classified as having the general formula $$HO-Ar-R_n-Ar-OH$$

in which Ar in each occurrence represents a divalent aromatic radical, preferably phenylene, but also can be polynuclear, such as biphenylene, a fused ring structure having an aromatic character such as naphthylene, anthrylene and the like, or mixed polynuclear aromatic radicals such as

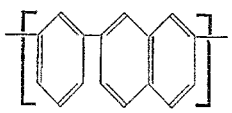

R in each occurrence can be an alkylene or alkylidene radical such as methylene, ethylene, propylene, propylidene, isopropylidene, butylene, butylidene, isobutylidene, amylene, isoamylene, anylidene, isoamylidene and the like; a cycloaliphatic radical such as cyclopentyl and cyclohexyl; a divalent radical formed from two or more alkylene or alkylidene groups connected by a nonalkylene or nonalkylidene group such as an aromatic linkage, a cycloaliphatic linkage, a tertiary amino linkage, an ether linkage, a thioether linkage, a carbonyl linkage, a sulfur-containing linkage such as sulfoxide or sulfone; an ether linkage, a carbonyl group, or a silicon-containing group; $n$ can be either zero or one.

Both Ar and R in the above general formula can contain substituent groups inert toward the reactants under the conditions of the reaction system. Such substituents include monovalent hydrocarbon groups such as methyl, ethyl, propyl, phenyl, naphthyl, benzyl, ethylphenyl, cyclopentyl, cyclohexyl and the oxy derivatives thereof; inorganic radicals such as chlorine, bromine, fluorine, nitro and the like.

Specifically illustrative of the dihydric phenols that may be employed in this invention, but in no way limitative thereof, are 2,2-bis-(4-hydroxyphenyl)-propane [Bisphenol-A];
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane; and the like.

Also included are dihydroxybenzenes typified by hydroquinone and resorcinol, dihydroxydiphenyls such as 4,4'-dihydroxydiphenyl; 2,2' - dihydroxydiphenyl; 2,4' - dihydroxydiphenyl; dihydroxynaphthalenes such as 2,6-dihydroxynapthalene, and the like; bis-(4-hydroxyphenyl)-sulfone; 2,4'-dihydroxydiphenyl sulfone; 5'-chloro-2,4'-dihydroxydiphenyl sulfone; 5' - chloro - 2,4' - dihydroxydiphenyl sulfone; 3'-chloro-4,4'-dihydroxydiphenyl sulfone; 4,4'-dihydroxytriphenyl disulfone, etc.; 4,4'-dihydroxydiphenyl ether; 4,4'-dihydroxytriphenyl ether; the 4,3'-, 4,2'-, 4,1'-, 2,2'-, 2,3'-, etc. dihydroxydiphenyl ethers; 4,4' - dihydroxy - 2,6 - dimethyldiphenyl ether; 4,4'-dihydroxy-2,5-dimethyldiphenyl ether; 4,4'-dihydroxy-3,3'-diisobutyldiphenyl ether; 4,4'-dihydroxy-3,3'-diisopropyldiphenyl ether; 4,4'-dihydroxy-3,2'-dinitrodiphenyl ether; 4,4' - dihydroxy - 3,3' - dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4 - dihydroxytetraphenyl ether; 4,4'-dihydroxypentaphenyl ether; 4,4' - dihydroxy - 2,6 - dimethoxydiphenyl ether; 4,4'-dihydroxy-2,5-diethoxy-diphenyl ether, etc. Mixtures of the dihydric phenols can also be employed and where dihydric phenol is mentioned herein, mixtures of such materials are considered to be included.

These dihydric phenols and others of the same class are well known in the art and have frequently been employed in the production of polycarbonate resins by prior known processes.

It will be obvious that a wide variety of modifications can be made without departing from the proper scope of the invention. The amount of water initially charged to the reactor, for instance, is by no means critical and may be considerably more or less than shown in the following examples without adversely affecting the course of the reaction. In another instance, the concentration of the sodium hydroxide solution which is introduced into the reactor simultaneously with the phosgene is also not critical. If the concentration of sodium hydroxide in this solution is quite large, the solution is viscous and not so easily metered. If the concentration is quite low, needless enlargement of the reactor may be required to accommodate the large amount of solution required. For these reasons the preferred concentration of the solution is from about 20 to 40 percent sodium hydroxide.

Reaction temperatures in the range of about 20° C. to about 30° C. have been found to be the most suitable for the process, although operation at temperatures either above or below this range is well within the skill of one trained in the art.

It is believed the process disclosed herein provides advantages which are not in the aggregate available in any other known method. These advantages include: a more exact control over the course of the phosgenation step—thus greater reproducibility; greater assurance of the completeness of the reaction without jeopardizing the alkali reserve required for the intermediate polymer coupling reaction; freedom from concern with inert impurities in the phosgene; the absence of a monomer recovery problem; a greatly lessened tendency for the reaction mass to completely emulsify; and a substantially lessened extent of side reaction occurrence so that greater latitude is now possible with respect to such variables as phosgene addition rate, total phosgene addition time, reaction temperature, and time lapse between phosgene addition and subsequent isolation and purification of the final polycarbonate product, the avoidance of many problems associated with washing the polymer product, and a substantial saving of caustic and neutralizing acid. Approximately a 25% increase in productivity is achieved by the elimination of the extra washing steps incurred when conventional caustic bodying is employed.

The following examples are explanatory of the present invention and are not intended to be in any way limitative thereof.

*Example I*

(A) To a two liter glass reactor equipped with a sealed stirrer, pH meter electrodes, thermometer, gas inlet tube, dropping funnel and a reflux condenser, were charged 125.0 grams (0.55 mole) 2,2-(4,4'-dihydroxy-diphenyl)-propane (Bisphenol A), 0.11 gram sodium hydrosulfite (an antioxidant), 1.67 grams (0.016 mole) of triethylamine, 2.40 grams of para-phenylphenol, 20.4 grams (0.51 mole, 46.4% of theoretical) of sodium hydroxide dissolved in 219.6 grams of water, and 550 grams of methylene chloride. The temperature of the system was established at about 25° C. The dropping funnel was charged with 36.8 grams (0.92 mole, 83.6% of the theoretical amount) of sodium hydroxide dissolved in 395.4 grams of water. With continued vigorous stirring phosgene gas (66 grams total) was bubbled into the reactor, and simultaneously the dropwise addition of the solution of sodium hydroxide in the dropping funnel was begun. The relative rates of addition of the sodium hydroxide in the phosgene were controlled so that the pH of the reaction mixture was maintained within the range of 10.8 to 11.3. Throughout the entire phosgenation reaction period (1 hr. 46 min.) temperature of the system was maintained at 25° C.±3. After the addition of sodium hydroxide solution was complete, phosgene addition was continued until the pH of the reaction mass had dropped to 7.0. At this point nitrogen gas was bubbled through the reaction mass for a period of about 20 minutes. Upon settling, an aqueous layer developed which was drawn off. Approximately 2 grams of phosphoric acid was added (in dilute aqueous solution, 500 ml. $H_2O$) to the organic polymer solution and agitated for 1 hour. The water phase was removed and the polymer mass washed five times with 500 ml. portions of water. The polymer was then coagulated by vigorous stirring with about 1,200 ml. of isopropanol, filtered, and dried. The final polycarbonate resin had a reduced viscosity at 25° C. in methylene chloride of 0.70. No unreacted phenolic compounds were detectable.

(B) Using substantially the same procedure as in Example I(A) except that after adding 70.5 grams of phosgene to a pH of 7.0, the reaction mass was stirred for ten minutes with 25 grams of NaOH dissolved in 50 grams of water. Four 500 ml. water washes were carried out before neutralization was undertaken. The final polymer had a reduced viscosity value (0.2 gram polymer in 100 ml. methylene chloride at 25° C.) of 0.64.

*Example II*

The procedure of Example I(A) was repeated except that the para-phenylphenol was not charged initially to the reactor, but was instead introduced into the system along with the sodium hydroxide solution in the dropping funnel. The same formulation was used as in Example I(A) except that 2.2 grams more of NaOH and 5 grams more of phosgene were employed. The reduced viscosity of the final polymer was ~0.70 (0.2 gram polymer in 100 ml. methylene chloride at 25° C.)

*Example III*

In order to demonstrate the vast difference in behavior toward a polycarbonate between the trialkylamine of the present invention and a conventional quaternary ammonium salt catalyst, a sample of a polycarbonate having a reduced viscosity of 0.77 was dissolved in a mixture of methylene chloride (80 grams), water (100 grams) and sodium hydroxide (10 grams). This solution was divided into two portions, one portion being admixed with 0.1 gram of triethylamine, and the other portion being admixed with 0.16 gram of benzyltrimethylammonium chloride. Both solutions were stirred for four hours and then washed and neutralized. After redrying, the reduced viscosity of each sample was measured. The reduced viscosity of the portion treated with the triethylamine was found to be 0.75, while the reduced viscosity of the portion treated with the quaternary ammonium salt was 0.43. It was obvious that the triethylamine did not degrade the polycarbonate while the quaternary salt caused pronounced degradation on contact.

*Example IV*

Using the general procedure of Example I(A) and substituting benzyltrimethylammonium chloride (60% aqueous solution) for the triethylamine, it was observed that the reaction product mass was emulsified and difficult to wash. In addition, approximately 2% of the Bisphenol-A was recovered as unreacted, and the reduced viscosity of the isolated polymer was only 0.34 (0.2 gram polymer/100 ml. methylene chloride at 25° C.).

Although the foregoing examples have described the process of the invention with a certain degree of particularity, it is to be understood that the improvement brought about by the use of the unique combination of a trialkylamine and p-phenylphenol can also be achieved by the use of this combination of catalysts in other similar prior art polycarbonate processes which are not illustrated by examples. In general, p-phenylphenol provides the advantages of being easier to handle than most phenols, being easier to purify and maintain in the pure state, being more heat stable than alkylated phenols, having little or no odor and imparting none to the polycarbonate. Para-phenylphenol terminated polycarbonates exhibit less tendency to advance in molecular weight when heat treated than do polycarbonates terminated with other phenols. The trialkylamine catalysts function more rapidly, efficiently, inexpensively, and do not induce polymer degradation.

Although the process has been described as using an aqueous sodium hydroxide solution, other alkali metal or alkaline earth metal compounds which give use to strongly basic aqueous solutions can also be employed, such as lithium, potassium, or calcium hydroxide or carbonate.

Inert organic solvents for the polymer which can suitably serve in the process include cyclohexane, methyl cyclohexane, benzene, toluene, xylene, chloroform and trichloroethylene.

What is claimed is:

1. In a process for preparing a substantially linear, thermoplasitc polycarbonate resin which includes the steps of reacting a dihydric phenol with phosgene and an alkali metal hydroxide in an amount sufficient to impart to the reaction system a pH value between about 10.5 and 11.8, the improvement which comprises conducting said reaction in contact with a bodying catalyst-chain growth terminator composition consisting essentially of p-phenylphenol and a trialkylamine having the general formula

wherein R, R' and R'' are each selected from the group consisting of alkyl radicals containing from 1 to 6 carbon atoms.

2. Process according to claim 1 wherein the dihydric phenol is a gem-bis(monohydroxyaryl)alkane.

3. Process according to claim 2 wherein the gem-bis-(monohydroxyaryl)alkane is a (4,4'-dihydroxy-diphenyl)alkane in which the central alkane group contains from 1 to 6 carbon atoms.

4. Process according to claim 2 wherein the gem-bis(monohydroxyaryl)alkane is 2,2-(4,4'-dihydroxy-diphenyl)propane.

5. Process according to claim 1 wherein the trialkyl amine is present in an amount of from about 0.01 to about 0.10 mole per mole of gem-bis(monohydroxyaryl) alkane present, and the para-phenylphenol is present in an amount of from about 0.005 to about 0.08 mole per mole of said gem-bis(monohydroxyaryl)alkane.

6. In a process for preparing a substantially linear, thermoplastic polycarbonate resin which includes the steps of reacting 2,2-(4,4'-dihydroxy-diphenyl)propane with phosgene in the presence of an inert organic solvent and aqueous sodium hydroxide in an amount sufficient to impart to the reaction system a pH value of between about 10.5 and 11.8, the improvement which comprises conducting said reaction in the presence of from about 0.01 to about 0.10 mole triethylamine per mole of 2,2-(4,4'-dihydroxy-diphenyl)propane and in the presence of from about 0.01 to about 0.04 mole para-phenylphenol per mole of said 2,2-(4,4'-dihydroxy-diphenyl)propane.

7. In a process for preparing a substantially linear thermoplastic polycarbonate resin which includes the steps of adding phosgene to a mixture of a dihydric phenol and an alkali metal hydroxide, the improvement which comprises adding a bodying catalyst-chain growth terminator composition consisting essentially of p-phenylphenol and a trialkyl amine having the general formula

wherein R, R' and R'' are each selected from the group consisting of alkyl radicals containing from 1 to 6 carbon atoms, the addition of said phosgene to said mixture being accomplished while maintaining the pH of said mixture within the range of about 10.5 to about 11.8 until the phosgenation of the said dihydric phenol is substantially complete, thereafter continuing the addition of phosgene until the pH of the said mixture decreases to a value of between about 7 and about 10, purging the mixture with an inert gas to remove any residual phosgene, neutralizing the mixture with acid, and thereafter purifying the polymer product.

8. The process according to claim 7 wherein the dihydric phenol is a gem-bis(monohydroxyaryl)alkane.

9. The process according to claim 7 wherein the neutralizing acid is phosphoric acid and the trialkylamine is triethylamine.

10. The process according to claim 9 wherein the gem-bis(monohydroxyaryl)alkane is 2,2-(4,4'-dihydroxy-diphenyl)-propane.

References Cited in the file of this patent
UNITED STATES PATENTS

| | | |
|---|---|---|
| 2,964,797 | Peilstocker | Dec. 20, 1960 |
| 2,970,131 | Moyer | Jan. 31, 1961 |

OTHER REFERENCES

Schnell: Ind. Eng. Chem., vol. 51, February 1959, pages 157–160.